United States Patent [19]
Budd

[11] Patent Number: 5,958,591
[45] Date of Patent: Sep. 28, 1999

[54] ELECTROLUMINESCENT PHOSPHOR PARTICLES ENCAPSULATED WITH AN ALUMINUM OXIDE BASED MULTIPLE OXIDE COATING

[75] Inventor: Kenton D. Budd, Woodbury, Minn.

[73] Assignee: Minnesota Mining and Manufacturing Company, St. Paul, Minn.

[21] Appl. No.: 08/884,838

[22] Filed: Jun. 30, 1997

[51] Int. Cl.⁶ .............................. B32B 5/16; C23C 16/06
[52] U.S. Cl. ........................ 428/403; 427/215; 427/218; 427/219; 427/255.1; 427/255.3; 427/255.7; 428/404
[58] Field of Search .................................. 428/403, 404; 427/212, 215, 218, 219, 248.1, 255, 255.2, 255.1, 255.7, 255.3; 252/301.4 R, 301.6 R, 301.6 S

[56] References Cited

U.S. PATENT DOCUMENTS

| | | | |
|---|---|---|---|
| 3,264,133 | 8/1966 | Brooks | 117/33.5 |
| 3,306,768 | 2/1967 | Peterson | 117/106 |
| 4,097,776 | 6/1978 | Allinikov | 313/502 |
| 4,508,769 | 4/1985 | Vanderkooi, Jr. et al. | 428/36 |
| 4,585,673 | 4/1986 | Sigai | 427/213 |
| 4,690,832 | 9/1987 | Yale | 427/65 |
| 4,691,140 | 9/1987 | Sakakibara et al. | 313/486 |
| 4,855,189 | 8/1989 | Simopoulos et al. | 428/690 |
| 4,990,371 | 2/1991 | Dutta et al. | 427/213 |
| 4,999,219 | 3/1991 | Klinedinst et al. | 427/69 |
| 5,057,363 | 10/1991 | Nakanishi | 428/321.5 |
| 5,080,928 | 1/1992 | Klinedinst et al. | 427/70 |
| 5,156,885 | 10/1992 | Budd | 427/70 |
| 5,220,243 | 6/1993 | Klinedinst et al. | 313/502 |
| 5,244,750 | 9/1993 | Reilly et al. | 428/690 |
| 5,411,398 | 5/1995 | Nakanishi et al. | 434/409 |
| 5,418,062 | 5/1995 | Budd | 428/403 |
| 5,593,782 | 1/1997 | Budd | 428/403 |

FOREIGN PATENT DOCUMENTS

| | | |
|---|---|---|
| 85104456 | 4/1985 | European Pat. Off. . |
| 91109665 | 6/1991 | European Pat. Off. . |
| 2 708 619 | 2/1995 | France . |
| 62-177087 | 8/1987 | Japan . |
| 63-318092 | 12/1988 | Japan . |
| WO 91/10715 | 7/1991 | WIPO . |

OTHER PUBLICATIONS

Database WPI Section Ch, Week 9801, Derwent Publications Ltd., London, GB; Class L03, AN 98–004352 & JP 09 272866 A (Toshiba KK), Oct. 21, 1997 (abstract).
Database WPI Section Ch, Week 9724, Derwent Publications Ltd., London, GB; Class L03, AN 97–264920 and JP 09 092217 A (Matsushita Electric Works Ltd), Apr. 4, 1997 (abstract).
Database WPI Section Ch, Week 8923, Derwent Publications Ltd., London, GB; Class K08, AN 89–169375 & JP 01 110590 A (Fujitsu Ltd.), Apr. 27, 1989 (abstract).
Database WPI Section Ch, Week 8724, Derwent Publications Ltd., London, GB; Class L03, AN 87–167608 & JP 62 100579 A (Nichia Kagaku Kogyo), May 11, 1987 (abstract).
Pantent Abstracts of Japan, vol. 098, No. 002, Jan. 30, 1998 & JP 09 263753 A (Toshiba Corp.), Oct. 7, 1997 (abstract).
Zoltan Szepesi, Willi Lehmann, and David Leksell, "Preparation and Characteristics of White EL Display Panels", Journal of Electronics Materials, vol. 7, No. 4, 1978, pp. 515–524.
Thornton, *Electroluminescence Maintenance*, Jour. Of Electrochem. Soc., pp. 895–907, vol. 107, No. 11, Nov. 1960.
Air Force Technical Report AFFDL–TR–68–103. Thompson et al., Jul. 1968 (relevant portions), pp. 1–10, 15–21, 42, 43, 47, 52, and 54.

*Primary Examiner*—Hoa T. Le
*Attorney, Agent, or Firm*—Brian E. Szymanski; Harold C. Knecht, III

[57] ABSTRACT

Encapsulated electroluminescent phosphor particles and a method of making same. Each phosphor particle is encapsulated by a substantially transparent aluminum oxide-based multiple oxide coating. The encapsulated phosphors exhibit high initial luminescent brightness and high resistance to humidity-accelerated decay of luminescent brightness. The aluminum oxide-based coating provides reduced sensitivity to chemical degradation caused by exposure to condensed moisture or otherwise liquid water. The coating comprises the aluminum oxide and at least one other metal oxide.

26 Claims, 1 Drawing Sheet

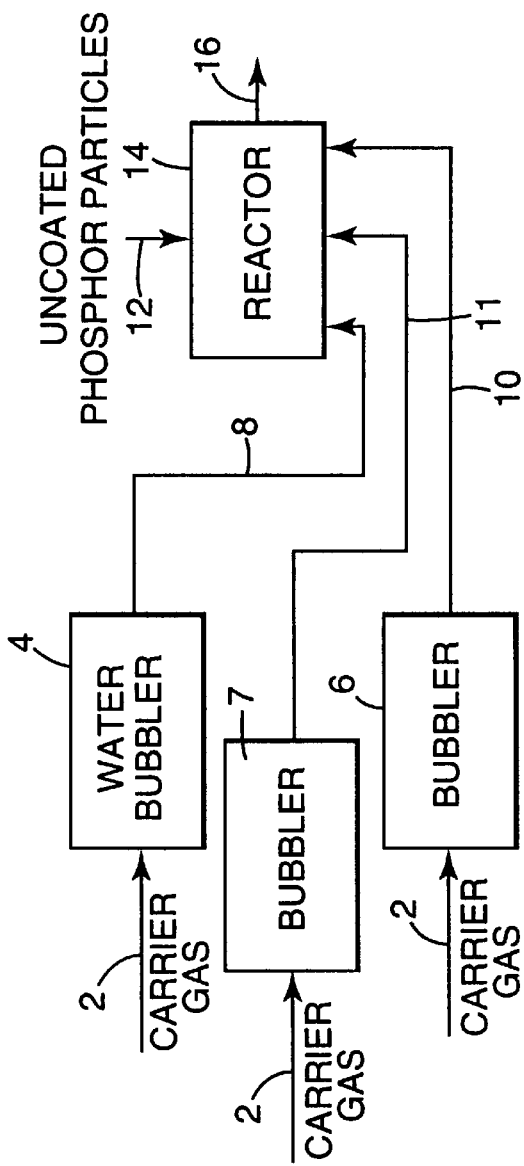
Fig. 1
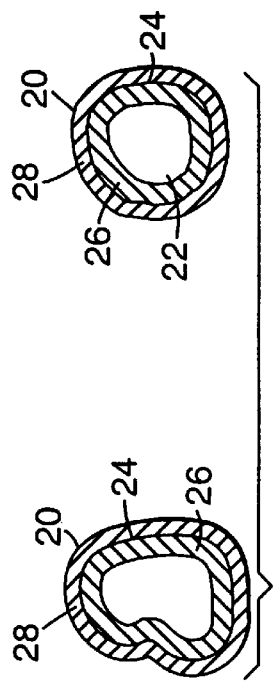
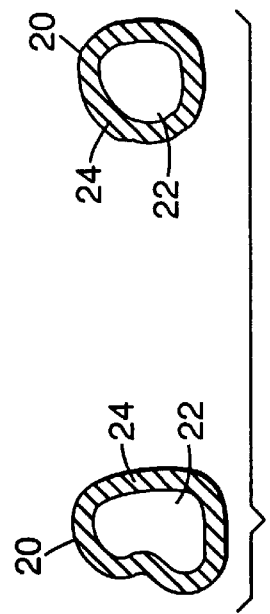
Fig. 2
Fig. 3

ELECTROLUMINESCENT PHOSPHOR PARTICLES ENCAPSULATED WITH AN ALUMINUM OXIDE BASED MULTIPLE OXIDE COATING

FIELD OF INVENTION

The present invention relates to electroluminescent phosphor particles, particularly, to phosphor particles which are encapsulated in a moisture resistant coating and exhibit high electroluminescent brightness and, even more particularly to such an electroluminescent phosphor particle encapsulated with an aluminum oxide-based multiple oxide protective coating having improved resistance to corrosion or chemical degradation from exposure to liquid water. The present invention also relates to a method for making such encapsulated phosphor particles and products made with these phosphor particles.

BACKGROUND

Phosphor particles are used in a variety of applications such as flat panel displays and decorations, cathode ray tubes, and fluorescent lighting fixtures. Luminescence or light emission by phosphor particles may be stimulated by application of various forms of energy including electric fields (electroluminescence). Electroluminescent ("EL") phosphors have significant commercial importance. The luminescent brightness of such phosphors and the "maintenance" of this brightness are two criteria typically used to characterize phosphor particles.

Luminescent brightness is typically reported as a quantity of light emitted by the subject phosphor when excited. Because of the sensitivity of phosphor emission brightness to varying conditions of excitement, it is often useful to report the brightness of phosphors as relative brightnesses rather than as absolute brightness. "Maintenance" refers to the rate at which phosphors lose brightness (i.e., decay) with operating time. The rate of decay is substantially increased if the phosphor particles are subjected to conditions of high humidity while being operated. This effect of moisture or high humidity has been referred to as "humidity-accelerated decay".

Particulate EL phosphors are most commonly used in thick film constructions. These devices typically include a layer of an organic material having a high dielectric constant and which forms a matrix for a load of phosphor particles. Such layers are typically coated on a plastic substrate having a transparent front electrode. A rear electrode is typically applied to the back side of the phosphor layer, with a dielectric layer sandwiched therebetween. When an electric field is applied across the electrodes, the proximate portions of the layer emit light as the phosphor particles therein are excited.

Organic matrices and substrate materials, as well as organic coatings applied to individual particles, have typically been ineffective in preventing the decay of brightness caused by the diffusion of water vapor to the phosphor particles. For this reason, thick film electroluminescent devices have been encased in relatively thick envelopes, e.g., 25 to 125 microns, of moisture-resistant materials such as fluorochlorocarbon polymers (e.g., ACLAR Polymers from Allied Chemical). However, such envelopes are typically expensive, result in unlit borders, and have the potential of delaminating, for example, under heat.

To improve their moisture resistance, phosphor particles have been encapsulated in an inorganic coating, such as a coating of one or two oxides. Inorganic coating techniques have been employed with varying degrees of success. Hydrolysis-based processes for encapsulating EL phosphor particles in an inorganic coating, e.g., hydrolysis-based chemical vapor deposition (CVD), have typically been the most successful. In hydrolysis-based CVD processes, water and oxide precursors are used to form the protective coating. Such hydrolysis-based CVD processes have been able to produce moisture insensitive encapsulated phosphor particles, while minimizing process related phosphor damage and retaining a high initial luminescent brightness. One such coating which has been considered desirable for encapsulating EL phosphors is a coating of aluminum oxide produced by a hydrolysis-based CVD process. The use of aluminum oxide to so coat phosphor particles has been found desirable, at least in part, because reactive, volatile precursors exist which can readily form aluminum oxide coatings exhibiting desirable optical, electrical and moisture protective properties.

Phosphor particles with such aluminum oxide coatings have been fabricated which exhibit high brightness and moisture insensitivity (i.e., the phosphor particle is protected to a certain degree from moisture in vapor form). However, amorphous and/or low temperature derived aluminum oxide coatings, such as those that have typically been produced by hydrolysis-based CVD processes, are susceptible to exhibiting undesirably low chemical durability against exposure to condensed moisture or otherwise liquid water. Such low chemical durability can preclude the use of such aluminum oxide coatings with aqueous polymer binder systems, can result in weak interfaces between the phosphor particle and the polymer matrix and/or can provide inadequate protection in condensing atmosphere conditions.

Therefore, there is a need for an aluminum oxide phosphor coating, such as the amorphous and/or low temperature derived aluminum oxide coatings produced by hydrolysis based CVD, which provides encapsulated EL phosphor particles, or phosphors in other forms, which exhibit high initial brightness, extended retained brightness (even in high humidity environments) and greater resistance to corrosion (i.e., chemical degradation) caused by exposure to condensed moisture or otherwise liquid water.

SUMMARY OF INVENTION

The present invention provides novel encapsulated phosphor particles, each having a substantially transparent aluminum oxide-based multiple oxide coating. The encapsulated phosphors exhibit high initial luminescent brightness and high resistance to humidity-accelerated decay of luminescent brightness. The aluminum oxide-based coating of the present invention exhibits reduced sensitivity to chemical degradation caused by exposure to condensed moisture or otherwise liquid water (i.e., greater resistance to corrosion in a liquid water environment). It is desirable for the present multiple metal oxide coating to be sufficiently resistant to chemical degradation (i.e., corrosion) from liquid water that sulfide-based particles encapsulated with the multiple metal oxide coating can survive immersion in a 0.1 molar silver nitrate aqueous solution, without discoloring, for at least twice as long as the same particles encapsulated with a coating of only the aluminum oxide. Such a silver nitrate test has typically been used to check the permeability of a phosphor coating. Because the silver nitrate is in an aqueous solution, it was found that this test could also be used to determine the chemical durability of the coating. Being more resistant to water induced corrosion enables the present metal oxide coating to survive for longer periods in a liquid water environment. The present invention also provides a novel method for making such encapsulated phosphor particles utilizing relatively low temperature vapor phase hydrolysis reactions and deposition processes.

The present invention is predicated, at least in part, upon the discovery that surprisingly marked increases in the chemical durability (i.e., reduction in corrosion) of aluminum oxide phosphor coatings, which are chemically susceptible to liquid water induced corrosion, can be obtained by using other metal oxides in combination with the aluminum oxide. It has also been found that, for aluminum oxide coatings deposited by a vapor phase hydrolysis-based process (i.e., hydrolysis-based aluminum oxide coatings), the addition of other oxides can be conveniently incorporated into the aluminum oxide during the deposition process, with little or no disruption of the tendency of aluminum oxide precursors to quickly and easily form coatings that are highly protective against the humidity-accelerated decay of luminescent brightness. It has been further found that hydrolysis-based CVD techniques can be used to conveniently deposit multiple metal oxides as a coating to so encapsulate phosphor particles.

Phosphor coatings according to the present invention can be made more chemically durable by mixing the aluminum oxide and the other metal oxide(s) together or, it is believed, by forming a layer of more chemically durable metal oxide (s) over a chemically sensitive layer of the aluminum oxide. It is believed that the teachings of the present invention are not only applicable to amorphous aluminum oxide-based multiple oxide coatings but also to crystalline or partially crystalline aluminum oxide-based multiple oxide coatings. It is also believed that the teachings of the present invention can be used to improve the resistance to liquid water induced corrosion of any aluminum oxide coating, for phosphors, which is susceptible to such corrosion. It is further believed that the teachings of the present invention can be used to improve the corrosion resistance of any such chemically sensitive aluminum oxide coatings, for phosphor particles, regardless of what temperature the coatings are formed at. Surprising, it is also believed that just a small amount of an additional metal oxide (e.g., silica) can significantly improve the chemical durability of an aluminum oxide coating. While not necessarily the case, an aluminum oxide-based multiple oxide coating according to the present invention will likely be formed at a temperature which will not significantly damage the encapsulated phosphor particle (i.e., will not result in an initial brightness of less than about 50% of the uncoated phosphor particle).

The exemplary phosphor particles disclosed herein are of the type that are stimulated to produce a luminescence or light emission by an electric field (i.e., electroluminescence). It is believed that the teachings of the present invention can also be applied to benefit other types of phosphor particles which are sensitive to moisture and can be encapsulated with an aluminum oxide coating formed from a vapor phase aluminum oxide precursor. Examples of such other types of phosphor particles may includes those which are stimulated by the application of heat (thermoluminescence), light (photoluminescence), or high energy radiation (e.g., x-rays or e-beams).

It has also been found that in addition to the much higher resistance to moisture related corrosion exhibited by the present aluminum oxide-based multiple oxide coatings, the present encapsulated phosphor particles can exhibit the same or even improved initial and retained brightness compared to that exhibited by the same phosphor particles encapsulated with just an aluminum oxide coating. Furthermore, it has been found that phosphor particles encapsulated with the present multiple oxide coating can exhibit a high electrical efficiency that is comparable to or exceeds that exhibited by phosphor particles encapsulated with only an aluminum oxide coating. For EL phosphors containing zinc (e.g., zinc sulfide), the present aluminum oxide-based multiple oxide coatings can provide the same, if not a greater, reduction in the loss of zinc from the phosphor by diffusion through the coating, compared to a coating of only the aluminum oxide. It is believed that other desirable properties imparted to phosphor particles by being encapsulated with an aluminum oxide coating may also be comparable or increase with the use of the present aluminum oxide-based multiple oxide coating.

In one aspect of the present encapsulated particles, each encapsulated particle comprises a phosphor particle of an electroluminescent phosphor material which would exhibit humidity-accelerated decay in the presence of moisture without the present coating. The substantially transparent multiple metal oxide coating is more resistant to chemical degradation from liquid water than a coating made of an aluminum oxide (e.g., alumina) and sufficiently encapsulates the phosphor particle to provide the phosphor particle with substantial protection from humidity-accelerated decay. The coating comprises the aluminum oxide and at least one other metal oxide, where the metal oxides are not in the form of the compound oxide mullite ($3Al_2O_3 2SiO_2$).

The at least one other metal oxide can include, by way of example only, a silicon oxide (e.g., silica), a boron oxide (e.g., boria), a titanium oxide (e.g., titania), a tin oxide, or a zirconium oxide (e.g., zirconia). It is contemplated that these and any other suitable metal oxides may be used individually or in combination.

The present multiple oxide coating can comprise a mixture of the aluminum oxide and the at least one other metal oxide. For example, the coating can comprise a mixture of the aluminum oxide, a silicon oxide and another metal oxide (e.g., a boron oxide). Alternatively, the multiple oxide coating may include at least an inner layer and an outer layer. For example, the inner layer can comprise the aluminum oxide, and the outer layer can comprise at least one other metal oxide. The outer layer can be a single metal oxide or a mixture of metal oxides. Multiple outer layers are also contemplated.

In another aspect of the present invention, a method of encapsulating phosphor particles is provided which comprises the steps of: providing a bed of phosphor particles, each of which exhibits humidity-accelerated decay in the presence of moisture; providing at least two precursors comprising a vapor phase aluminum oxide precursor and at least one other vapor phase metal oxide precursor; and exposing the bed to the precursors such that the precursors chemically react and encapsulate each phosphor particle with a multiple metal oxide coating, as described above. The vapor phase metal oxide precursors include any suitable precursor capable of forming the desired metal oxide for the coating. The resulting coating is substantially transparent, more resistant to chemical degradation from liquid water than a similar coating consisting essentially of aluminum oxide, and sufficiently encapsulating to provide the phosphor particle with substantial protection from humidity-accelerated decay. An exemplary coating comprises an aluminum oxide and a silicon oxide, with or without at least one other metal oxide.

The present method can be a hydrolysis-based process that includes exposing the bed to water vapor so as to coat each phosphor particle by a vapor phase hydrolysis reaction of the vapor phase aluminum oxide precursor and the at least one other vapor phase metal oxide precursor (i.e., the vapor phase metal oxide precursors chemically react, via hydrolysis, on or near each phosphor particle and bond to each phosphor particle in the form of an encapsulating coating). It can be desirable for the present method to be a hydrolysis based chemical vapor deposition process. It is desirable for the hydrolysis reaction to occur at a temperature that is low enough to at least substantially minimize, if not eliminate, temperature related damage to the phosphor particles. For example, it is desirable for the encapsulated particles to retain a high initial luminescent brightness (e.g., greater than 50% of that exhibited by the uncoated phosphor particles). It is also desirable for this temperature to be sufficiently low to minimize, if not eliminate, temperature related damage to other properties of the phosphor particles including their color and optical and electrical properties. Such low temperature metal oxide coatings are often, though not necessarily, amorphous.

The present method can be used to form the present multiple metal oxide coating with an inner and outer layer by exposing the bed of phosphor particles to the vapor phase aluminum oxide precursor so as to chemically react and encapsulate each phosphor particle with an inner layer comprising the aluminum oxide. The bed can then be exposed to the another vapor phase metal oxide precursor or multiple precursors so as to chemically react and encapsulate each inner layer with an outer layer comprising the at least one other metal oxide. If desired, this outer layer can likewise be encapsulated with one or more other outer layers of the same or a different metal oxide or mixture of oxides. As an example, the inner layer of aluminum oxide can be encapsulated by an outer layer comprising a silicon oxide and at least one additional metal oxide.

The objectives, features, and advantages of the present invention will become apparent upon consideration of the present specification and the appended drawings.

BRIEF DESCRIPTION OF THE DRAWINGS

FIG. 1 is a schematic illustration of one embodiment of the method for making encapsulated phosphor particles in accordance with the present invention;

FIG. 2 is a cross-sectional illustration of one embodiment of encapsulated phosphor particles of the invention; and FIG. 3 is a cross-sectional illustration of another embodiment of encapsulated phosphor particles of the invention.

These figures are idealized and are intended to be merely illustrative and non-limiting.

DETAILED DESCRIPTION OF ILLUSTRATIVE EMBODIMENTS

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

A phosphor particle coated according to the present invention can comprise, for example, a zinc sulfide-based phosphor, a calcium sulfide-based phosphor, a zinc selenide-based phosphor, strontium sulfide-based phosphor or combinations thereof. Phosphors used in the present invention may be formulated in accordance with conventional practices. For example, zinc sulfide based phosphors are well-known and commonly include one or more of such compounds as copper sulfide, zinc selenide, and cadmium sulfide in solid solution within the zinc sulfide crystal structure or as second phases or domains within the particle structure. Good test results have been obtained with the commercially available phosphor Sylvania Type 729. It is believed that similar or even better results can be obtained using other phosphors. Phosphor particles used herein may be of many sizes, typically depending to a large extent on the particular application. Each phosphor particle of the present invention is sufficiently coated with an aluminum oxide-based multiple oxide coating to provide the phosphor particle with substantial protection from humidity-accelerated decay.

As used herein, a metal oxide or oxide refers to a material made up primarily of at least one metal and oxygen. The oxide may also contain amounts of other elements and compounds, including those originating in the precursor materials or phosphor particles, which can be generated in coating form on phosphor particles under conditions that are at least similar to that described herein. For example, as used herein, a metal oxide can include an oxide of a metal (e.g., titania, silica, alumina, tin oxide, zirconia, boria, etc.), a hydroxide of a metal (e.g., aluminum hydroxide), a compound containing oxygen and at least one metal, or a combination thereof. Advantageous results have been obtained with coatings of aluminum oxide and silicon oxide, as well as coatings of aluminum oxide, silicon oxide and boron oxide. It is believed that useful results may also be obtained with coatings of aluminum oxide and oxides of other metals, for example, tin, zirconium, magnesium, calcium.

The present multiple oxide coatings are thin enough to be substantially transparent yet thick enough to provide sufficient impermeability to moisture. Coatings which are too thick may tend to be less transparent and result in reduced brightness.

The method of the present invention comprises the steps of: providing a bed of phosphor particles, each of which exhibits humidity-accelerated decay in the presence of moisture; providing at least two precursors comprising a vapor phase aluminum oxide precursor and at least one other vapor phase metal oxide precursor; and exposing the bed to the precursors such that the precursors chemically react and encapsulate each phosphor particle with a multiple metal oxide coating, as previously described. The vapor phase metal oxide precursors include any suitable precursor capable of forming the desired metal oxide for the coating. The resulting coating is substantially transparent, more resistant to chemical degradation from liquid water than a similar coating consisting essentially of aluminum oxide, and sufficiently encapsulating to provide the phosphor particle with substantial protection from humidity-accelerated decay. An exemplary coating comprises an aluminum oxide and a silicon oxide, with or without a boron oxide. An illustrative embodiment of the present method is shown schematically in FIG. 1.

For illustrative purposes only, the present method that was used to produce the encapsulated particles described in detail below (see the Table) is a hydrolysis-based process, more particularly, a hydrolysis-based chemical vapor deposition (CVD) process that includes exposing the bed to water vapor so as to coat each phosphor particle by a vapor phase hydrolysis reaction of the vapor phase aluminum oxide precursor and the at least one other vapor phase metal oxide precursor. The hydrolysis reactions each occurred at a low enough temperature to at least substantially minimize temperature related damage to the phosphor particles being encapsulated. It is believed that the low temperature multiple metal oxide coatings produced by this method are amorphous.

Uncoated phosphor particles 12 are placed in a reactor 14 and heated to the appropriate temperature. In order to form coatings which sufficiently encapsulate the phosphor particles, the particles are preferably agitated while in the reaction chamber 14. Illustrative examples of useful methods for agitating the phosphor particles include shaking, vibrating, or rotating the reactor, stirring the particles, or suspending them in a fluidized bed. In such reaction chambers, the particles may be agitated by many different ways such that essentially the entire surface of each particle is exposed and the particles and reaction precursors may be well intermixed. Typically, a preferred reaction chamber is a fluidized bed reactor. Fluidizing typically tends to effectively prevent agglomeration of the particles, achieve uniform mixing of the particles and reaction precursor materials, and provide more uniform reaction conditions, thereby resulting in highly uniform encapsulation characteristics.

Although not required in many instances, when using phosphor particles which tend to agglomerate, it may be desired to add fluidizing aids, e.g., small amounts of fumed silica. Selection of such aids and of useful amounts thereof may be readily determined by those with ordinary skill in the art.

The desired precursor materials in vapor phase are then added to the reactor 14 so as to produce a vapor phase hydrolysis reaction to form a coating of multiple oxide materials on the surfaces of the phosphor particles and thereby encapsulating them. The following is an illustrative vapor phase hydrolysis reaction:

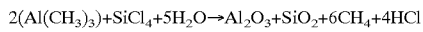

$$2(Al(CH_3)_3) + SiCl_4 + 5H_2O \rightarrow Al_2O_3 + SiO_2 + 6CH_4 + 4HCl$$

In the illustration, water vapor, trimethyl aluminum (TMA) and silicon tetrachloride are considered oxide precursor materials. In addition, the illustrative reaction is for the formation of an anhydrous oxide. Under certain conditions such a hydrolysis reaction may produce, at least partially, hydrous oxides, which can also be useful in the practice of the present invention. It is believed that the amount of hydroxylation and/or hydration that results from the vapor phase hydrolysis reaction would depend on the temperature at which the reaction occurs. The water to oxide precursor ratio may also have an affect.

One technique for getting the precursor materials into vapor phase and adding them to the reaction chamber is to bubble a stream of gas, preferably inert, referred to herein as a carrier gas 2, through a neat liquid of the precursor material and then into the reaction chamber 14. Illustrative examples of inert gases which may be used herein include argon and nitrogen. Oxygen and/or air may also be used. An advantage of this technique is that the carrier gas/precursor streams may be used to fluidize the phosphor particles in the reaction chamber, thereby facilitating the desired encapsulation process. In addition, such a technique provides means for readily controlling the rate of introduction of the precursor materials into the reactor 14. Referring again to FIG. 1, carrier gas 2 is bubbled through a water bubbler 4 to produce water vapor-containing precursor stream 8. Carrier gas 2 is also bubbled through at least two other bubblers 6 and 7 to produce at least two metal oxide precursor streams 10 and 11. Bubbler 6 contains a neat liquid of an aluminum oxide precursor material (e.g., TMA). Bubbler 7 contains a neat liquid of another metal oxide precursor material (e.g., $SiCl_4$). Precursor streams 8, 10 and 11 are then transported into reactor 14.

The present method can be used to form a multiple metal oxide coating comprising a mixture of aluminum oxide and at least one other metal oxide (i.e., a mixed metal oxide coating) or a coating comprising an inner layer of aluminum oxide and at least one outer layer of at least one other metal oxide (i.e., a layered metal oxide coating). When forming a mixed metal oxide coating, all of the streams 8, 10 and 11 are transported into the reactor 14 at the same time. When forming a layered metal oxide coating, streams 8 and 10 are first transported into the reactor 14 until the particles are encapsulated by the aluminum oxide inner layer. Streams 8 and 11 are then transported into the reactor 14 to encapsulate the aluminum oxide inner layer with the outer layer of the at least one other metal oxide. It may be desirable for the inner layer to comprise a mixture of aluminum oxide and one or more other metal oxides. This can be accomplished by transporting one or more other metal oxide precursor streams with streams 8 and 10. It may also be desirable, with or without a mixed oxide inner layer, for the outer layer to comprise a mixture of two or more metal oxides other than aluminum oxide. The outer layer may also be a mixture of aluminum oxide and another metal oxide.

Precursor flow rates are adjusted to provide an adequate deposition rate and to provide an oxide coating of desired quality and character. Flow rates are adjusted such that the ratios of precursor materials present in the reactor chamber promote oxide deposition at the surface of the phosphor particles.

Optimum flow rates for a particular application typically depend in part upon the temperature within the reaction chamber, the temperature of the precursor streams, the degree of particle agitation within the reaction chamber, and the particular precursors being used. Useful flow rates may be readily determined with trial and error experimentation. It is desirable for the flow rate of the carrier gas used to transport the precursor materials to the reaction chamber to be sufficient to agitate the phosphor particles as desired and also transport optimal quantities of precursor materials to the chamber.

It is also desirable for the precursor materials to have sufficiently high vapor pressures that large enough quantities of precursor material will be transported into the reactor for the hydrolysis reaction and coating process to proceed at a conveniently fast rate. For instance, precursor materials having higher vapor pressures will typically provide faster deposition rates than will precursor materials having lower vapor pressures, thereby enabling the use of shorter encapsulation times. Precursor sources may be heated to increase the vapor pressure of the material. In order to prevent condensation between the heated source and the reactor, it may be necessary to heat the tubing or other means used to transport the precursor material to the reactor. In many instances, like those found tabulated below, the precursor materials will be in the form of neat liquids at room temperature. In some instances, the precursor materials may be available as solids which are or can be made sublime.

The precursor materials that are the most desirable are those that are capable of forming the present multiple metal oxide coatings via hydrolysis reactions at temperatures that are low enough not to cause substantial damage to the phosphor particles. Such factors as the presence of damaging chemical components in the precursor materials (e.g., water and chlorides) can affect the temperature at which substantial damage occurs. It is desirable for the temperature of the reactor to be maintained at low temperatures to help insure that the coatings being deposited are sufficiently encapsulating and provide desired protection against corrosion from liquid water and humidity-accelerated decay, while avoiding intrinsic thermal damage or adverse thermochemical reactions at the surfaces of the particles which cause undesirable loss of initial brightness. Encapsulation processes which are performed at temperatures which are too low may tend to result in coatings which do not provide the desired resistance to humidity-accelerated decay. Such coatings are not sufficiently moisture impermeable because, it is believed, of having a more open structure or a structure which contains excess trapped or unreacted water or other precursor components. Encapsulation processes which are performed at temperatures which are too high may result, for example, in decreased electroluminescent brightness, undesirable changes or shifts in the color of the light emitted by the subject phosphor, or degradation of the intrinsic decay characteristics of the subject phosphor material. Precursor materials that have produced advantageous results are as tabulated below.

In addition to the precursor materials tabulated below, useful results are also expected with other metal alkoxides, e.g., aluminum isopropoxide, and zirconium n-propoxide, and other metal alkys, e.g., diethyl zinc and triethyl borane. It is desirable for the mutually reactive precursor materials, e.g., $SiCl_4$ and $H_2O$, to not be mixed prior to being added to the reactor in order to prevent premature reaction within the transport system. Accordingly, multiple gas streams into the reactor chamber are typically provided.

Although it has been suggested in the prior art that exposing phosphor particles to high temperatures, e.g., above about 350° C., tends to reduce the initial luminescent brightness thereof, it has been found that phosphor particles may be degraded by exposure to lower temperatures, e.g., about 170 to about 210° C., under certain conditions. While I do not wish to be bound by this theory, it is postulated that phosphor materials are not sensitive only to the temperatures to which they are exposed, but that one or more effects caused by exposure of the particles to certain compositions, e.g., exposure to certain compounds, also exist, and that such effects are also dependent upon temperature. A specific mechanism is not yet determined, but it is believed that the surface of the phosphor particles may undergo some change by exposure to such agents as, for example, hydrochloric acid which affects the luminescent brightness of the resultant encapsulated particle. Hydrochloric acid can be generated during the deposition of aluminum oxide coatings from, for example, the metal oxide precursor dimethyl aluminum chloride (DMAC).

Referring again to FIG. 1, following encapsulation, encapsulated phosphor particles 16 of the invention are removed from reactor 14. As illustrated in FIG. 2, encapsulated phosphor particles 20 of the present invention can each comprise a particle 22 of phosphor material which is encapsulated within a mixed metal oxide coating 24 according to the present invention. As illustrated in FIG. 3, encapsulated phosphor particles 20 of the present invention may also each comprise a phosphor particle 22 encapsulated within a layered metal oxide coating 24 having an inner layer 26 comprising an aluminum oxide and an outer layer 28 comprising at least one other metal oxide (e.g., titania), where the outer layer 28 encapsulates the inner layer 26. Each layer 26 and 28 of the layered metal oxide coating 24 can be individual metal oxides or a mixture of metal oxides. A mixed metal oxide forming a layer or all of the coating 24 may be homogeneous on a near atomic scale or somewhat heterogeneous with small regions containing either more or less of the metal oxides with respect to the overall composition of the coating 24.

Encapsulated phosphor particles of the invention provide both high resistance to liquid water induced corrosion and humidity-accelerated decay while substantially retaining their intrinsic properties. For instance, there is typically little or no shift in the emission spectra of phosphor particles encapsulated as taught herein, such particles typically retain a substantial portion of their initial luminescent brightness, and the intrinsic decay characteristics are typically similar to, if not better than, those of the uncoated phosphor particles. The resistance to humidity-accelerated decay is typically such that the rate of brightness loss when operated while directly exposed to high humidity, e.g., a relative humidity of greater than 95 percent, is remarkably similar to the intrinsic brightness loss exhibited during operation in a dry environment, e.g., a relative humidity of less than about 10 percent.

EXAMPLES

The invention will be further explained by the following illustrative examples (see the Table) which are intended to be nonlimiting.

Encapsulation Process

Basically, a conventional encapsulation process was followed, like that disclosed in U.S. Pat. No. 5,156,885, which is incorporated herein by reference in its entirety. 30 millimeter diameter fluidized bed reactors were used, each consisting of a glass-frit type funnel with a single bottom inlet and containing suitably sized frit (e.g., size C or D) at the bottom of the reactor bed (i.e., base frit) and the phosphor particles on top of the base frit. Each reactor was modified so as to be heated to a desired temperature in a controlled manner (e.g., by oil bath immersion or wire tape heating). A separate gas inlet tube was used to introduce each of the precursor vapors into each reactor. Instead of using glass frit, the tip of each inlet tube was tapered so as to disperse the precursor vapors. That is, the taper was such that precursor vapors bubbled out of the inlet tubes and into the phosphor particles sitting above the base flit.

For each reactor, the gas inlet tubes for the metal oxide precursors were each inserted into the fluidized bed, extending through the phosphor particles, so as to introduce the metal oxide precursor vapor streams (i.e, the carrier gas and precursor vapors) into the reactor just above the base frit near or at the bottom of the phosphor particles (i.e., the reaction zone). For the tabulated results, the metal oxide precursor inlet tubes were inserted through the top of the funnel reactor. As an alternative, these inlet tubes could have been disposed through a side of the reactor. A separate inlet tube, for each reactor, was connected to the bottom inlet of the funnel reactor to introduce water vapor and carrier gas into the base frit at the bottom of the reactor. In this way, the hydrolysis reaction substantially occurred in the phosphor particles and not in the base frit.

Suitably sized bubblers were used for each of the precursors. The size of each bubbler and how much each inlet tube is tapered depends, at least in part, on the volatility of the precursor material and the flow rate through the bubblers needed to produce the desired flow rate through the reactor. The bubblers were each kept at about room temperature.

Nitrogen carrier gas was bubbled through each of the applicable liquid metal oxide precursors and through the water. The stream of water containing carrier gas was then passed through the funnel frit supporting the phosphor particles. The streams of oxide precursor containing carrier gas were each passed through their respective inlet tube and into the bed of phosphor particles. A reagent grade neat liquid of one aluminum oxide precursor and a reagent grade neat liquid of at least one other metal oxide precursor were used as indicated. The aluminum oxide precursors used in the tabulated examples were: trimethyl aluminum (TMA) and dimethyl aluminum chloride (DMAC), both of which can be purchased from Akzo Chemical, Inc. of Chicago, Ill. The other metal oxide precursors used included silicon oxide and boron oxide precursors. The specific exemplary metal oxide precursors that were used are: tetraethylorthosilicate (TEOS), silicon tetrachloride ($SiCl_4$) and trimethyl borate (TMB), which can be purchased from Aldrich Chemical Company of Milwaukee, Wis.; and triethyl borane (TEB), which can be purchased from Akzo Chemical, Inc.

Brightness Tests

The retained electroluminescent brightness of the tabulated phosphor samples was determined using a saturated air test (i.e., oil grid test) like that disclosed in the previously incorporated U.S. Pat. No. 5,156,885. The resulting test data tabulated below is in Foot-Lamberts (Ft·L).

Phosphor Specifications

Commercially available Sylvania type 729 phosphor particles were used in the tabulated examples. The physical properties of the 729 phosphor, including its size distribution, is very similar to that of the Sylvania type 723, 723RB, and 728 phosphors. The type 729 phosphor is a green zinc sulfide-based phosphor, like type 728. Each 30 mm diameter reactor, used for the tabulated examples, was charged with 60 grams of the Sylvania 729 phosphor particles.

brightness testing as a percentage of the initial luminescent brightness of the same phosphor in a fresh, uncoated condition.

Samples of the encapsulated phosphor particles (i.e., aluminum oxide and multiple oxide coated) were subjected to saturated air testing to determine the retained brightness and resistance to humidity-accelerated decay of the various coated phosphor particles in environments of at least 95% humidity for extended periods of time. The retained brightness of each continuously operated brightness cell of the phosphor particle samples was measured as a percentage of the initial brightness of the same phosphor particles. The results tabulated above indicate that the type of aluminum oxide precursor used (e.g., DMAC or TMA) may affect the long term resistance to humidity-accelerated decay exhibited by the resulting encapsulated phosphor particles. The results of these tests also indicate that at least for some aluminum oxide precursors (e.g., DMAC), the use of one or more other metal oxide precursors in combination with the aluminum oxide precursor can improve the long term resistance to humidity-accelerated decay and, therefore, the long term retained brightness of the encapsulated phosphor particles. The long term resistance to humidity-accelerated decay resulting from the use of a particular metal oxide precursor or precursors may depend on the deposition conditions employed for that particular precursor.

Other samples of the phosphor particles were removed from each reactor, after the encapsulation period and immersed in 0.1 molar silver nitrate aqueous solution and observed. Uncoated phosphor particles will turn black

TABLE

Run Conditions and Properties of Phosphor Particles with Aluminum Oixde Coatings and Aluminum Oxide-Based Mixed Oxide Coating

| Aluminum Oxide (cc/min) | Water (cc/min) | Silicon Oxide (cc/min) | Boron Oxide (cc/min) | Reactor Temp (°C.) | Encapsulation Period (hours) | Silica Content of Coating | Initial Brightness After Coating | Retained Brightness After Saturated Air Test 0 hrs 24 hrs 192 hrs 312 hrs | | | | Silver Nitrate Test |
|---|---|---|---|---|---|---|---|---|---|---|---|---|
| DMAC 250 | 600 | | | 140 | 4 | — | 4% | not tested | | | | ~2 days |
| DMAC 150 | 1500 | | | 145 | 5 | — | 84% | 5.7 | 5.8 | 0.1 | — | ~2 days |
| DMAC 150 | 1500 | | | 170 | 3 | — | 75% | 5.5 | 6.0 | 1.5 | — | ~2 days |
| DMAC 100 | 800 | TEOS 800 | | 150 | 3 | 13% | 64% | test problem | | | | |
| DMAC 100 | 800 | TEOS 800 | | 210 | 3 | 21% | 70% | test problem | | | | >14 days |
| DMAC 200 | 1000 | $SiCl_4$ 25 | | 150 | 3 | 25% | 74% | 6.7 | 7.1 | 5.3 | 4.4 | |
| DMAC 150 | 1500 | $SiCl_4$ 50 | | 200 | 3 | 34% | 77% | 5.3 | 3.4 | 3.8 | 4.3 | >14 days |
| TMA 200 | 800 | | | 175 | 5 | — | 88% | 5.0 | 4.8 | 5.0 | 5.2 | ~2 days |
| TMA 100 | 800 | TEOS 800 | | 150 | 3 | 20% | 82% | 8.5 | 4.6 | 0.3 | — | |
| TMA 100 | 800 | TEOS 800 | | 210 | 3 | 22% | 89% | 8.9 | 8.2 | 3.0 | 0.4 | |
| TMA 100 | 800 | TEOS 800 | TMB 10 | 175 | 3 | — | 83% | 9.2 | 8.4 | 7.7 | 6.8 | >14 days |
| TMA 160 | 800 | $SiCl_4$ 20 | | 175 | 5 | 29% | 73% | 2.9 | 1.8 | 1.9 | 2.3 | >50 days |
| TMA 160 | 800 | $SiCl_4$ 20 | TMB 20 | 175 | 5 | — | 80% | 5.3 | 5.0 | 4.8 | 4.9 | ~5 days |
| TMA 100 | 800 | $SiCl_4$ 25 | | 175 | 5 | 37% | 80% | 4.6 | 1.8 | 2.2 | 2.6 | >50 days |
| TMA 100 | 800 | $SiCl_4$ 25 | TMB 25 | 175 | 5 | — | 82% | 5.1 | 4.8 | 4.6 | 4.7 | >10 days |
| TMA 80 | 800 | $SiCl_4$ 35 | | 175 | 5 | 41% | 78% | 5.5 | 4.3 | 3.8 | 4.4 | >50 days |

During the encapsulation process, the temperature of the reactor for each example was controlled to within the range from about ±5° C. to about ±10° C. of the temperature tabulated above. Flow rates refer to the metered volume of a carrier gas (e.g., nitrogen gas) through the indicated solutions. The flow rates of dry nitrogen through the water and metal oxide precursor bubblers were as tabulated above in centimeters$^3$/minute (cc/min). The encapsulation process was run for the time periods tabulated above. The silica content of the coating is in mole percent, on a cation basis.

The Initial Brightness values for the tabulated phosphor particle examples were determined at the beginning of the within a few minutes of exposure to such a silver nitrate solution, from silver sulfide formation. The tabulated time periods for the silver nitrate testing indicates when the encapsulated phosphor particles being tested began to significantly turn dark or black and began to aggregate together. This silver nitrate testing indicates the susceptibility of each metal oxide coating to water induced corrosion. As can be seen from the test results tabulated above, the phosphor particles encapsulated with an aluminum oxide coating (i.e., formed using only an aluminum oxide precursor) are significantly more sensitive to chemical degradation (i.e., corrosion) from exposure to liquid water than the aluminum oxide-based coatings (i.e., those formed using a combination of an aluminum oxide precursor and at least one other metal oxide precursor).

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A plurality of encapsulated particles, each of said encapsulated particles comprising:
   a phosphor particle of an electroluminescent phosphor material which exhibits humidity-accelerated decay in the presence of moisture; and
   a substantially transparent multiple metal oxide coating which is more resistant to chemical degradation from liquid water than an aluminum oxide coating and which sufficiently encapsulates said phosphor particle to provide said phosphor particle with substantial protection from humidity-accelerated decay, said coating comprising said aluminum oxide and at least one other metal oxide which are not in the form of the compound mullite.

2. The encapsulated particles as set forth in claim 1, wherein each of said encapsulated particles has an initial electroluminescent brightness which is equal to or greater than about 50 percent of the initial electroluminescent brightness of said phosphor particle.

3. The encapsulated particles as set forth in claim 1, wherein said encapsulated phosphor particles comprise phosphor particles made with at least one of a zinc sulfide-based phosphor, a calcium sulfide-based phosphor, a zinc selenide-based phosphor, a strontium sulfide-based phosphor and a combination thereof.

4. The encapsulated particles as set forth in claim 1, wherein said coating includes at least an inner layer and an outer layer, said inner layer comprises said aluminum oxide and said outer layer comprises said at least one other metal oxide.

5. The encapsulated particles as set forth in claim 1, wherein said coating comprises a mixture of said aluminum oxide and said at least one other metal oxide.

6. The encapsulated particles as set forth in claim 1, wherein said coating comprises a mixture of said aluminum oxide and a silicon oxide.

7. The encapsulated particles as set forth in claim 6, wherein said coating further comprises a boron oxide.

8. The encapsulated particles as set forth in claim 1, wherein said aluminum oxide includes alumina and said at least one other metal oxide includes silica.

9. A plurality of encapsulated particles, each of said encapsulated particles comprising:
   a phosphor particle of an electroluminescent phosphor material which exhibits humidity-accelerated decay in the presence of moisture; and
   a substantially transparent multiple metal oxide coating which is more resistant to chemical degradation from liquid water than an aluminum oxide coating and which sufficiently encapsulates said phosphor particle to provide said phosphor particle with substantial protection from humidity-accelerated decay, said coating comprising said aluminum oxide, a silicon oxide and at least one other metal oxide.

10. The encapsulated particles as set forth in claim 9, wherein said coating includes at least an inner layer and an outer layer, said inner layer comprises said aluminum oxide and said outer layer comprises said silicon oxide and said at least one other metal oxide.

11. The encapsulated particles as set forth in claim 9, wherein said coating comprises a mixture of said aluminum oxide, said silicon oxide and said at least one other metal oxide.

12. The encapsulated particles as set forth in claim 9, wherein said at least one other metal oxide includes a boron oxide.

13. A method of encapsulating phosphor particles comprising the steps of:
   providing a bed of phosphor particles, each of which exhibits humidity-accelerated decay in the presence of moisture;
   providing at least two precursors comprising a vapor phase aluminum oxide precursor and at least one other vapor phase metal oxide precursor; and
   exposing the bed to the precursors such that the precursors chemically react and encapsulate each phosphor particle with a multiple metal oxide coating that comprises an aluminum oxide and at least one other metal oxide, wherein the aluminum oxide and the at least one other metal oxide are not in the form of the compound mullite, and the coating is substantially transparent, more resistant to chemical degradation from liquid water than a coating consisting essentially of aluminum oxide, and sufficiently encapsulating to provide the phosphor particle with substantial protection from humidity-accelerated decay.

14. The method as set forth in claim 13, wherein said method includes the step of providing water vapor, and said step of exposing includes exposing the bed to the water vapor so as to coat each phosphor particle by a vapor phase hydrolysis reaction of the vapor phase aluminum oxide precursor and the at least one other vapor phase metal oxide precursor.

15. The method as set forth in claim 14, wherein said method is a hydrolysis based chemical vapor deposition process, and during said step of exposing, the vapor phase hydrolysis reaction occurs at a temperature that is low enough to at least substantially minimize temperature related damage to the phosphor particles and retain a high initial luminescent brightness of the phosphor particles.

16. The method as set forth in claim 13, wherein said method includes the step of providing at least a vapor phase silicon oxide precursor as the at least one other vapor phase metal oxide precursor.

17. The method as set forth in claim 13, wherein said method includes the step of providing, as the at least one other vapor phase metal oxide precursor, at least a vapor phase silicon oxide precursor and at least one additional vapor phase metal oxide precursor.

18. The method as set forth in claim 13, wherein said method includes the step of providing, as the at least one other vapor phase metal oxide precursor, at least a vapor phase silicon oxide precursor and a vapor phase boron oxide precursor.

19. The method as set forth in claim 13, wherein said step of exposing includes a step of exposing the bed to the vapor phase aluminum oxide precursor so as to chemically react and encapsulate each phosphor particle with an inner layer, and another step of exposing the bed to the other vapor phase metal oxide precursor so as to chemically react and encapsulate each inner layer with an outer layer, where the inner layer comprises the aluminum oxide and the outer layer comprises the at least one other metal oxide.

20. The method as set forth in claim 19, wherein said other step of exposing the bed to the other vapor phase metal oxide precursor comprises a step of exposing the bed to a vapor phase silicon oxide precursor and at least an additional vapor phase metal oxide precursor so as to chemically react and encapsulate each inner layer with an outer layer comprising the silicon oxide and at least one additional metal oxide.

21. A method of encapsulating phosphor particles comprising the steps of:

providing a bed of phosphor particles, each of which exhibits humidity-accelerated decay in the presence of moisture;

providing at least three precursors comprising a vapor phase aluminum oxide precursor, a vapor phase silicon oxide precursor and at least one other vapor phase metal oxide precursor; and exposing the bed to the precursors such that the precursors chemically react and encapsulate each phosphor particle with a multiple metal oxide coating that comprises an aluminum oxide, a silicon oxide and at least one other metal oxide, wherein the coating is substantially transparent, more resistant to chemical degradation from liquid water than a similar coating consisting essentially of aluminum oxide, and sufficiently encapsulating to provide the phosphor particle with substantial protection from humidity-accelerated decay.

22. The method as set forth in claim 21, wherein said method includes a step of providing water vapor, and said step of exposing includes exposing the bed to the water vapor so as to coat each phosphor particle by a vapor phase hydrolysis reaction of the vapor phase aluminum oxide precursor and the at least one other vapor phase metal oxide precursor.

23. The method as set forth in claim 21, wherein said step of exposing includes a step of exposing the bed to the vapor phase aluminum oxide precursor so as to chemically react and encapsulate each phosphor particle with an inner layer, and another step of exposing the bed to the vapor phase silicon oxide precursor and the at least one other vapor phase metal oxide precursor so as to chemically react and encapsulate each inner layer with an outer layer, where the inner layer comprises the aluminum oxide and the outer layer comprises the silicon oxide and the at least one other metal oxide.

24. The method as set forth in claim 23, wherein said step of exposing the bed to the other vapor phase metal oxide precursor comprises exposing the bed to a vapor phase silicon oxide precursor and a vapor phase boron oxide precursor so as to chemically react and encapsulate each inner layer with an outer layer comprising the silicon oxide and the boron oxide.

25. The method as set forth in claim 21, wherein said method is a hydrolysis based chemical vapor deposition process, and during said step of exposing, the vapor phase hydrolysis reaction occurs at a temperature that is low enough to at least substantially minimize temperature related damage to the phosphor particles and retain a high initial luminescent brightness of the phosphor particles.

26. The method as set forth in claim 21, wherein said method includes the step of providing at least a vapor phase boron oxide precursor as the at least one other vapor phase metal oxide precursor.

* * * * *